(12) United States Patent
Tanaka et al.

(10) Patent No.: US 7,776,487 B2
(45) Date of Patent: Aug. 17, 2010

(54) PRESSURE REGULATOR FOR A FUEL CELL, FUEL SUPPLY SYSTEM FOR A FUEL CELL USING THE REGULATOR, ELECTRONIC EQUIPMENT HAVING THE FUEL SUPPLY SYSTEM, AND FUEL CARTRIDGE FOR A FUEL CELL

(75) Inventors: Akira Tanaka, Mito (JP); Osamu Kubota, Hitachi (JP); Yasuaki Nakamura, Sunto (JP)

(73) Assignees: Hitachi, Ltd., Tokyo (JP); Tokai Corporation, Tokyo (JP)

( * ) Notice: Subject to any disclaimer, the term of this patent is extended or adjusted under 35 U.S.C. 154(b) by 1196 days.

(21) Appl. No.: 11/295,498

(22) Filed: Dec. 7, 2005

(65) Prior Publication Data

US 2006/0141302 A1   Jun. 29, 2006

(30) Foreign Application Priority Data

Dec. 8, 2004   (JP) .............................. 2004-354956
Dec. 8, 2004   (JP) .............................. 2004-354959

(51) Int. Cl.
   *H01M 8/04*   (2006.01)
   *H01M 2/00*   (2006.01)
(52) U.S. Cl. ..................... 429/506; 429/443; 429/447
(58) Field of Classification Search ................ 429/34, 429/32, 87, 443, 554; 266/252
   See application file for complete search history.

(56) References Cited

U.S. PATENT DOCUMENTS 3,180,763 A * 4/1965 Miller et al. .................. 429/25

FOREIGN PATENT DOCUMENTS

| JP | 2002-049440 | 2/2002 |
|----|-------------|--------|
| JP | 2003-115308 | 4/2003 |
| JP | 2004-179140 | 6/2004 |

OTHER PUBLICATIONS

Machine translation of JP 2002-049440, Hayashi et al., Feb. 2002.*
Machine translation of JP 20030-115308, Miyakoshi et al., Apr. 2003.*

* cited by examiner

*Primary Examiner*—Jonathan Crepeau
*Assistant Examiner*—Kenneth Douyette
(74) *Attorney, Agent, or Firm*—Antonelli, Terry, Stout & Kraus, LLP.

(57) ABSTRACT

A fuel supply system for a fuel cell supplies fuel to a fuel cell of an electronic equipment. The fuel supply system includes a pressure regulator for regulating primary pressure to secondary pressure, and a pair of cylindrical fuel cartridges which are connected to a pair of inlets on a primary pressure side. The inlets being provided to both sides of the pressure regulator are arranged in mutually opposite directions. Fuel having primary pressure is took in from the inlets into the pressure regulator. The fuel cartridges are placed to both sides of the pressure regulator along a substantially straight-outer edge of the electronic equipment.

18 Claims, 9 Drawing Sheets

PRESSURE REGULATOR FOR A FUEL CELL, FUEL SUPPLY SYSTEM FOR A FUEL CELL USING THE REGULATOR, ELECTRONIC EQUIPMENT HAVING THE FUEL SUPPLY SYSTEM, AND FUEL CARTRIDGE FOR A FUEL CELL

CLAIM OF PRIORITTY

The present application claims priority from Japanese application serial no. 2004-354956, filed on Dec. 8, 2004, and no. 2005-354959, filed on Dec. 8, 2004, the contents of which are hereby incorporated by reference into this application.

FIELD OF THE INVENTION

The present invention relates to a pressure regulator for a fuel cell, a fuel supply system for a fuel cell using the regulator, electronic equipment having the apparatus, and a fuel cartridge for a fuel cell. Particularly, the present invention relates to, e.g., a pressure regulator and fuel supply system for a fuel cell preferable for electronic equipment such as a notebook computer having a fuel cell as a power supply.

BACKGROUND OF THE INVENTION

In recent years, fuel cells have been noted as portable power supplies. For example, as disclosed in Japanese Patent Laid-Open No. 2003-115308 (Patent document 1), a pressure regulating mechanism including the following components is known: a first pressure regulating chamber and second pressure regulating chamber separated by a partition; and a third pressure regulation chamber separated from the second pressure regulation chamber by another partition; a pressure regulating wall defining the third pressure regulation chamber; and a supporting shaft which is connected to this pressure regulation wall and penetrates the partitions, and can move forward and backward. This pressure regulating mechanism has one connecting hole for an external system in communication with the first pressure regulating chamber, and another connecting hole for the external system in communication with the second pressure regulating chamber. In this pressure regulating mechanism, a fluid (gas) can flow into one of the connecting holes and discharge from anther.

On the other hand, notebook personal computers (hereinafter called notebook PCs) including such a fuel cell are known as portable electronic equipments (Patent document 2: Japanese Patent Laid-Open No. 2004-179149; Patent document 3 Japanese Patent Laid-Open No. 2002-49440). These notebook PCs include a main unit on which keys for inputting characters are arranged, and a cover member which is pivotally hinged to the main unit and can cover the main unit. A fuel cartridge for supplying fuel to a fuel cell is mounted to the outer edge of the front side of the cover member, namely, to the outer edge opposite the hinge portion. The fuel is supplied from this fuel cartridge to a panel type fuel cell. The fuel cell is provided to the rear of a display liquid crystal panel of the cover member. A fuel cell disclosed in the patent document 2 is a direct methanol fuel cell for directly supplying methanol to a fuel electrode of a fuel cell. The direct methanol fuel cell does not need a reformer, so that a structure of the system can be simple.

Therefore, in the case where a notebook PC is carried somewhere other than home, when an additional fuel cartridge is carried, a used fuel cartridge is exchanged to the new one, and thus electronic equipment such as a notebook PC can be used continuously without worrying running out of fuel.

In order to install a pressure regulating mechanism and fuel cartridge disclosed in the patent document 1 to a compact electronic equipment such as a notebook PC disclosed in the patent document 2, the pressure regulating mechanism and fuel cartridge need to be compact. The pressure regulating mechanism disclosed in the patent document 1 has only one outer connecting hole into which a fuel flows, and can mount one fuel cartridge. Since a usable duration of electronic equipment is determined in accordance with a supply amount of a fuel when the same type of fuel is supplied, a capacity of the fuel cartridge is preferably large. When electronic equipment such as a notebook PC is carried around, and used somewhere other than home, an interchangeable fuel cartridge may be carried around. Therefore, the fuel cartridge is preferably compact. In recent years, such contrary requests need to be satisfied. For example, when two fuel cartridges are mounted to increase a fuel capacity, a pressure regulating mechanism for two fuel cartridges becomes large. Therefore, it is difficult to install the pressure regulating mechanism in a small space such as a notebook PC.

The fuel cartridge disclosed in the patent document 3 has a full length of the outer edge of the cover member. The whole fuel cartridge projects from the outer edge. The fuel cartridge disclosed in the patent document 2 is placed inside the outer edge of the cover member along the outer edge of the cover member.

The fuel cartridges disclosed in the patent documents 2, 3 are large compared to a size of a notebook PC, and inconvenient to carry. When the fuel cartridges are made compact to be convenient to carry, a duration of the power supply is shortened. Therefore, there is not so much benefit to use fuel cells as power supplies.

The above two related arts (patent documents 2, 3) are fuel supply systems where fuel is supplied to a fuel cell by use of a weight of the fuel itself. Therefore, in order to supply fuel to a panel type fuel cell placed to the cover member, the fuel cell is necessarily placed to the upper edge of the cover member. As a result, because of the heavy fuel cell, the stability of the notebook PC is decreased when the PC is used.

In view of such problems, the present invention is to provide a compact pressure regulator for a fuel cell, the regulator being able to incorporate at least two fuel cells and to be installed in a small space.

Furthermore, the present invention is to provide a fuel supply system for a fuel cell and a fuel cartridge used in the system, wherein an electronic equipment using a fuel cell can be used for long time, while using a compact fuel cartridge convenient to carry.

Further, the present invention is to provide a fuel supply system for a fuel cell and a fuel cartridge used in the system, wherein when the fuel supply system and the fuel cartridge are installed in electronic equipment, the stability of the electronic equipment can be maintained and the fuel supply system and fuel cartridge do not occupy so much space.

SUMMARY OF THE INVENTION

A pressure regulator for a fuel cell of the present invention is, for example, configured as follows. The pressure regulator is for use in a fuel supply system for supplying fuel to a fuel cell of electronic equipment. The pressure regulator includes inlets for taking in fluid (it includes "fuel") with primary pressure; a regulating valve for reducing fuel pressure from primary pressure to secondary pressure; a pressure regulating chamber into which the fuel passing through the regulating valve flows; a diaphragm arranged between the pressure regulating chamber and an atmospheric chamber so as to undergo displacement in response to the secondary pressure in the pressure regulating chamber; a linkage for linking the regulating valve to the diaphragm; and an outlet for discharging secondary-pressure fuel. And the inlets are arranged in mutually opposite directions.

In one embodiment of the present invention, the outlet is arranged along an outer edge of the electronic equipment and directed perpendicularly to an axis passing through the pressure regulator. The perpendicular direction includes the direction of an angle of 90 degrees or the direction of angle slightly shifted from 90 degrees.

It is preferable that the pair of the fuel inlets are arranged anti-symmetrically or substantially anti-symmetrically with reference to the axis.

Specifically, the pair of the inlets can be arranged anti-symmetrically or substantially anti-symmetrically with reference to a central axis of a diaphragm.

The above regulating valve and the diaphragm configure a pressure-reducing valve mechanism. Namely, the pair of the fuel inlets are placed anti-symmetrically or substantially anti-symmetrically with reference to an axis of the pressure-reducing valve mechanism. In this case, it is preferable that a common liquid-receiving chamber for receiving fuel took in from any of the inlets may be provided on an axis of the pressure-reducing valve mechanism and immediately upstream the pressure-reducing valve mechanism.

A fuel supply system of the present invention is characterized by: a pressure regulator having a pair of inlets being arranged in mutually opposite directions, a mechanism for converting primary-pressure of fuel took in via the inlets into secondary-pressure, and an outlet for sending out secondary-pressure fuel to the fuel cell, and a pair of cylindrical fuel cartridges which are respectively connected with the inlets of the pressure regulator to supply primary-pressure fuel. Further, the fuel cartridges are placed across the pressure regulator from each other along a substantially-straight outer edge of the electronic equipment.

In one embodiment of the present invention, the outlet of the fuel regulator may be comprised of a discharge nozzle for discharging the secondary-pressure fuel regulated by the pressure regulator. And the discharge nozzle may be arranged in a direction perpendicular to the substantially-straight outer edge. The discharged fuel is supplied the fuel cell in the electronic equipment. The perpendicular angle includes an angle of 90 degrees and an angle slightly shifted from 90 degree.

In one embodiment of the present invention, the fuel cartridge may have a plug with a nozzle to be connected to an inlet. The nozzle may be provided at an eccentric arrangement relative to a central axis of a cylinder of each fuel cartridge. The plugs as inlet of the pressure regulator are arranged in mutually opposite directions with correspondence to the nozzle arrangement of the fuel cartridge.

The electronic equipment may be a notebook personal computer. The fuel supply system may be placed near a hinge portion of a main unit of the computer along a cover member connected to the body via the hinge portion.

The fuel cartridge may be configured that a fuel cylinder as a fuel supply source; and a plug with a nozzle provided at one end of the cylinder. The plug is positioned eccentrically relative to a central axis of the cylinder.

The electronic equipment of the present invention is structured as follows.

The electronic equipment includes a fuel cell, a cartridge loading portion for mounting a fuel supply cartridge for supplying fuel to the fuel cell, and a fuel pressure regulator for regulating pressure of fuel. The cartridge loading portion has a structure where at least a pair of the fuel supply cartridges are loaded along an outer edge of the electronic equipment to be on opposite sides of the fuel pressure regulator. The pressure regulator has at least a pair of fuel inlets opposed to each other. The inlets can be connected to the fuel supply cartridges.

DETAILED DESCRIPTION OF THE PREFERRED EMBODIMENTS

Figure 1:
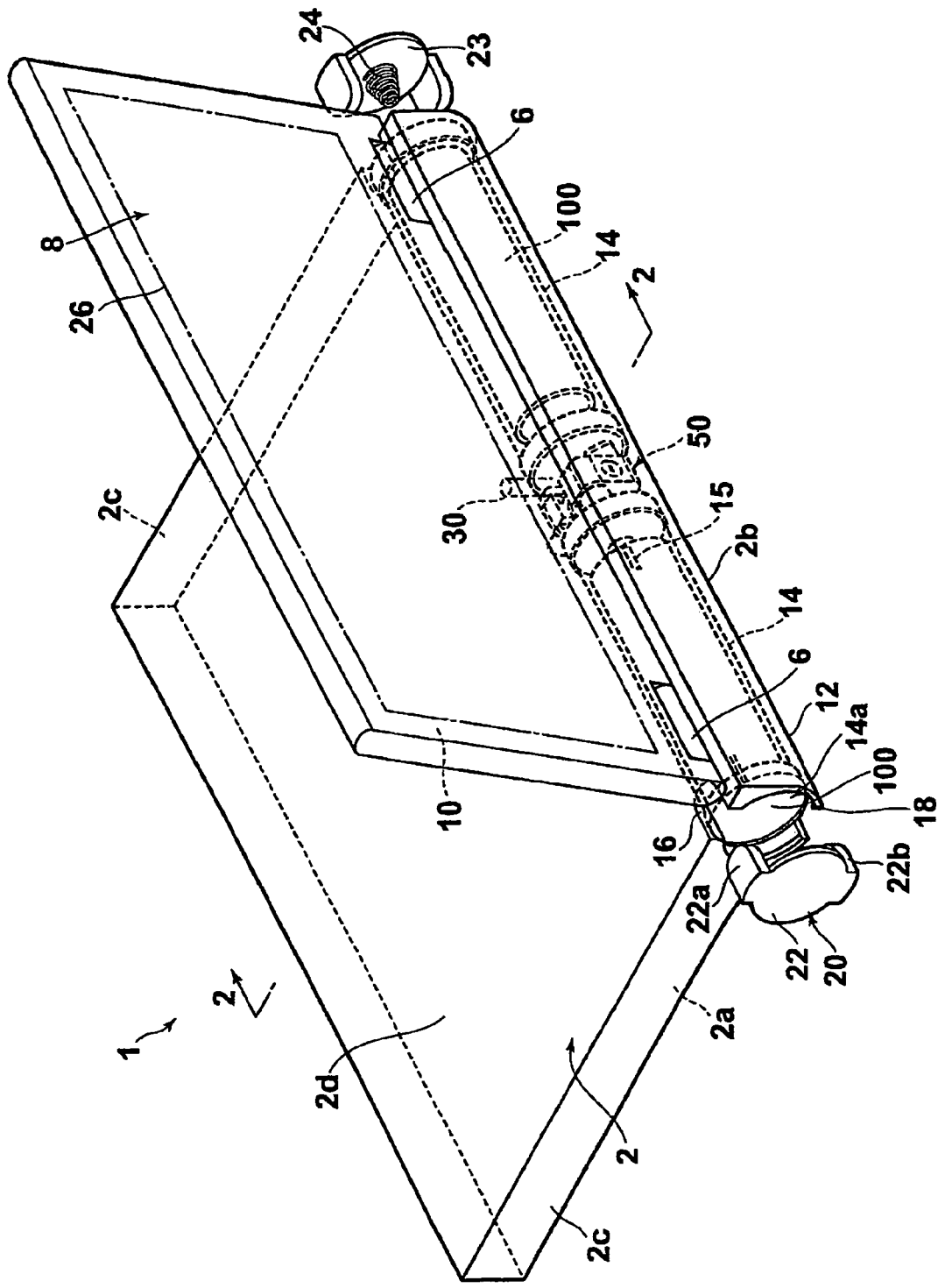
FIG. 1 is a schematic perspective view of a notebook PC with a fuel supply system and fuel cartridge used for the system.
Figure 2:
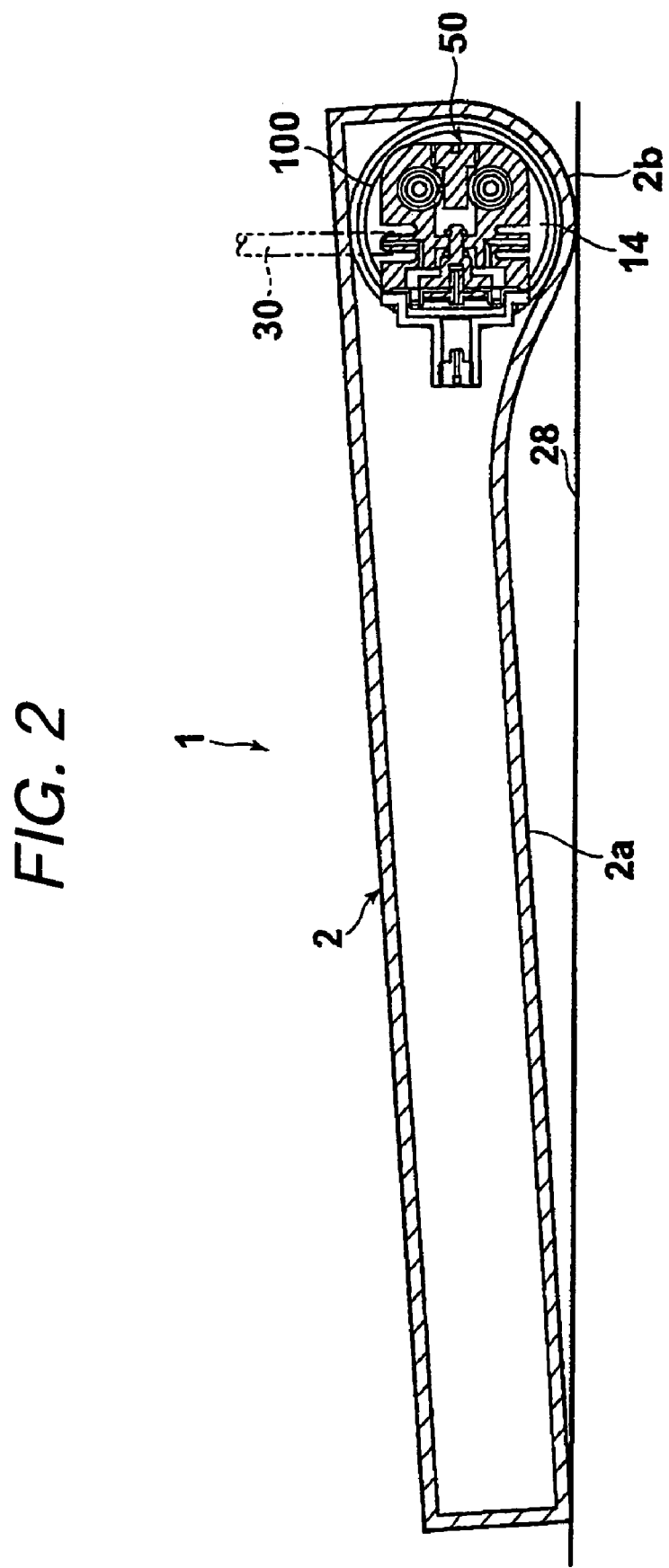
FIG. 2 is a cross section of a unit of the notebook PC along a line 2-2 in FIG. 1.

Embodiments of a fuel supply system for a fuel cell of the present invention are explained below in detail in reference to the drawings. FIG. 1 is a schematic perspective view of a fuel supply system and a notebook PC 1 (electronic equipment) incorporating fuel cartridges. These show one embodiment of the present invention. FIG. 2 shows a cross section of a body of the notebook PC, the cross section being along the line 2-2 of FIG. 1. As shown in FIGS. 1, 2, the notebook PC 1 includes electronic components such as a CPU (central processing unit, not shown). The notebook PC 1 has a rectangular main unit 2 where a keypad (not shown) is arranged on a top surface 2d, and a cover member 8 which is pivotally hinged at a rear end of the main unit 2. The cover member 8 has a rectangular shape for covering the main unit 2. For the convenience, the front of the notebook PC 1 is on an operator side of the notebook PC 1 (on the left side in FIG. 1), and the rear of the notebook PC 1 is on the opposite side(on the right side in FIG.

2). A liquid crystal display panel, namely, a display section 10 is installed to a front side of the cover member 8, and the front side faces the operator side when opening the cover member 8. A panel type fuel cell 26 is installed to a rear side of the liquid crystal display section 10 of the cover member 8. In FIG. 1, only an area where the fuel cell 26 is positioned is shown by a chain line. The fuel cell 26 itself is not a point of the present invention, and thus not explained in detail.

A rear side of an undersurface 2a of the main unit 2A has a curved convex section 2b which bulges out along a straight outer edge 12 of the main unit 2. The curved convex section 2b enables the top surface 2d of the notebook PC 1 to tilt toward the operator slightly, when the notebook PC 1 is placed on a planar surface 28 such as a desk. Accordingly, the operator keys a keyboard easily.

A pair of cartridge loading cavities (hereinafter called "loading cavities") 14 to be used as cartridge-housings are formed inside the curved convex section 2b along the outer edge 12, and the loading cavities 14 respectively have openings on both side surfaces 2c of the main unit 2. A pressure regulator 50 of the fuel supply system is placed between the loading cavities 14. Each fuel cartridge (hereinafter called "a cartridge") 100 is inserted from each opening 14a of the respective loading cavities 14, and connected to the pressure regulator 50.

Since the two (single pair) loading cavities 14 are the same, only one of the loading cavities 14 is explained. Notches 16, 18 respectively are provided at the top surface 2d of the main unit 2 and at the curved convex section 2b of the undersurface 2a close to the opening 14a of the loading cavity 14. The notches 16, 18 are formed in the longitudinal direction of the loading cavity 14. Each of notches 16, 18 has a width and length to such an extent that the cartridge 100 can be easily accessed by fingers, the length being along the outer edge 12. The cartridge 100 being loaded to the loading cavity 14 and connected to the pressure regulator 50 can be held by fingers through the notches 16, 18 and removed.

In the loading cavity 14, keying means for positioning the cartridge 100 in the circumferential direction, namely, a key rib 15 is formed. The key rib 15 projects on the inner surface of the loading cavity 14 along the longitudinal direction of the loading cavity 14 to engage an after-mentioned key groove 106 (FIG. 4) of the cartridge 100 inserted in the loading cavity 14.

A cap 20 is put on the opening 14a of the loading cavity 14. The cap 20 has a plate section 22 in the shape of a substantially-disc, and the plate section 22 is substantially flush with the side surface 2c of the main unit 2 when the cap 20 is put on the opening 14a. Tongues 22a and 22b for respectively fitting to the notches 16, 18 integrally are formed with the plate section 22. The tongues 22a and 22b project from a top edge and a under edge of the plate section 22 and are perpendicular to the plate section 22. The cap 20 and the opening 14a are fitted with each other and fixed by suitable means such as convex-concave engaging means (not shown) or latch engaging means (not shown) using a latch arm. These engaging means may be provided at the cap 20 and main unit 2 so as to be compatible with each other. An elastic member such as a coil spring 24 which presses the loaded cartridge 100, is attached on an inner surface 23 (namely, a surface facing the loading cavity 14) of the plate section 22. The elastic member is not limited to the coil spring 24. A plate spring, a sponge foamed resin, and a rubber can be used as the elastic member. Instead of the cap 20, a ratchet holder for holding the cartridge may be used.

When any of the cartridges 100 is connected to pressure regulator 50, pressure of fuel injected into the regulator 50 from the cartridge 100 is regulated by the regulator 50. The pressure-regulated fuel is supplied to the fuel cell 26, for example, via a flexibility tube 30 (silicon tube etc.) being connected to the pressure regulator 50.

Figure 3A:
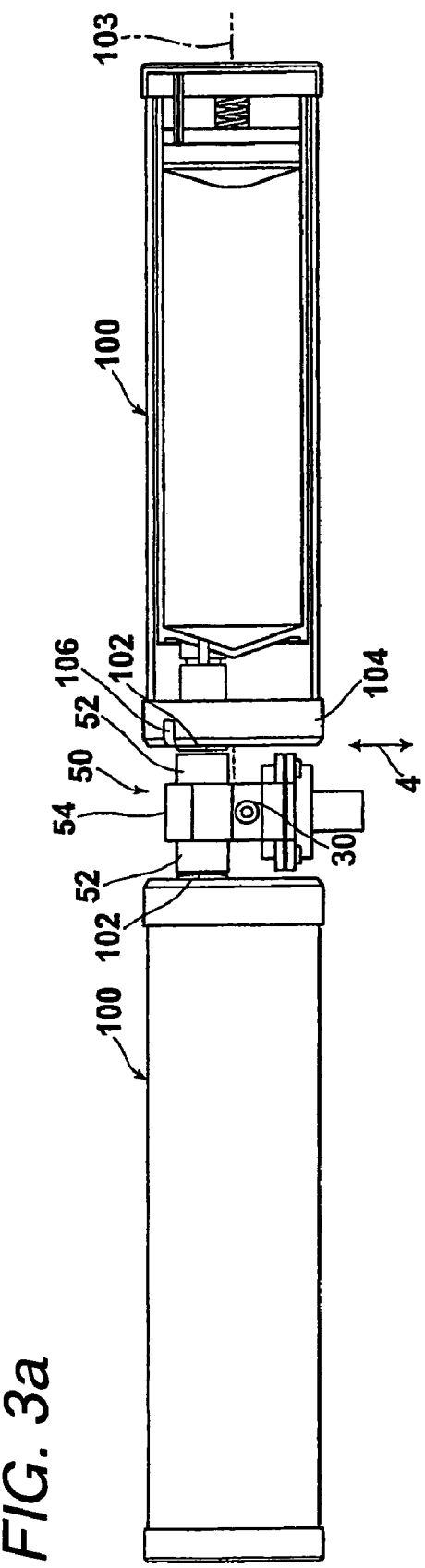
FIG. 3A is a plane view showing a positional relationship between the fuel supply system for and fuel cartridges when the fuel cartridges are attached to the fuel supply system.
Figure 3B:
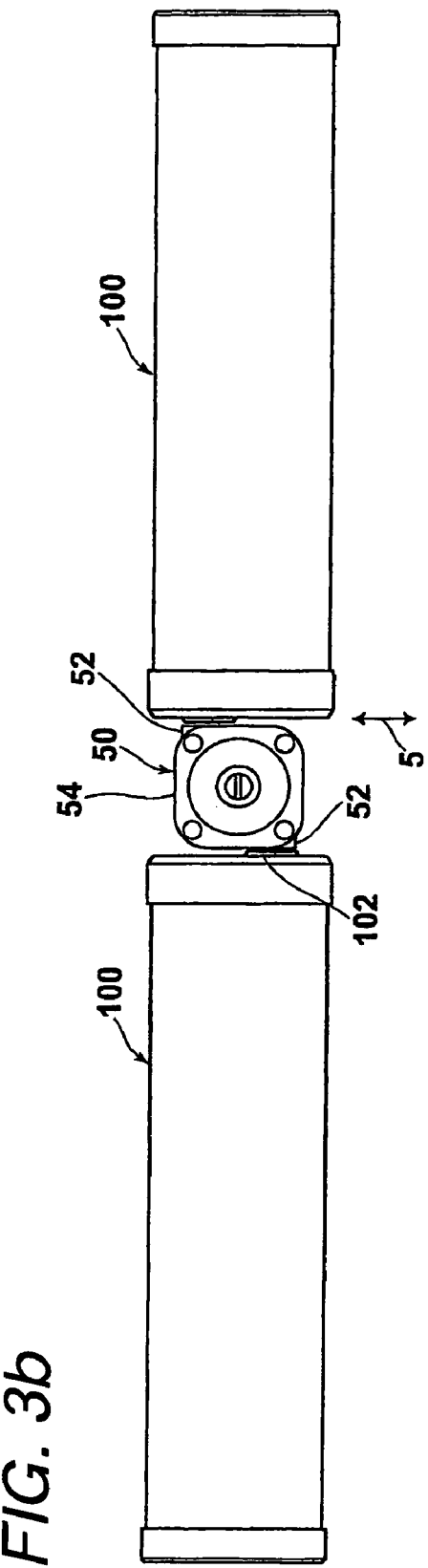
FIG. 3B is a front view showing a positional relationship between the fuel supply system and fuel cartridges when the fuel cartridges are attached to the fuel supply system.

Next, an arrangement relationship among the cartridges 100 and the pressure regulator 50 will be explained in reference to FIGS. 3A and 3B. FIGS. 3A, 3B show the arrangement relationship among the pressure regulator 50 and cartridges 100 when the cartridges 100 are connected to the pressure regulator 50. FIG. 3A is a plane view. FIG. 3B is a front view. The cartridges 100 are respectively connected sockets 52 which are inlets of the pressure regulator 50. The sockets 52 are formed at a housing 54 of the pressure regulator 50 so as to be arranged in mutually opposite directions. In FIG. 3A, it appears that these sockets (inlets) 52 are in the same position in the fore and aft direction 4, namely, when seen from above. But as shown in FIG. 3B, when seen from front, these sockets 52 to be single pair are arranged anti-symmetrically or substantially anti-symmetrically with reference to an axis 103 of the pressure regulator 50 in the vertical direction 5. Plugs 102 as connectors of the cartridges 100 are inserted to the sockets (inlets) 52 of the pressure regulator 50. Each plug 102 is provided at one end of the cylinder of each cartridge 100 and is positioned eccentrically relative to a central axis 103 of the cartridge cylinder 100. The above-described tube 30 formed to the pressure regulator 50 is visible in FIG. 3A.

A pair of cartridges 100 connected to the pressure regulator 50 are the same type as each other. As shown in FIG. 3A, the key groove 106 directed in the inserting direction of each cartridge 100 is formed on the shoulder section 104 of the cartridge. The key groove 106, as described above, engages the key rib 15 in the loading cavity 14, so that a positioning in the circumferential direction of each cartridge 100 is decided. This positioning enables each plug 102 to be positioned to the socket 52 and thus to be inserted smoothly when the cartridge 100 is inserted. The positioning means of each cartridge at the time of inserting the cartridge is limited to the keying means.

Figure 4:
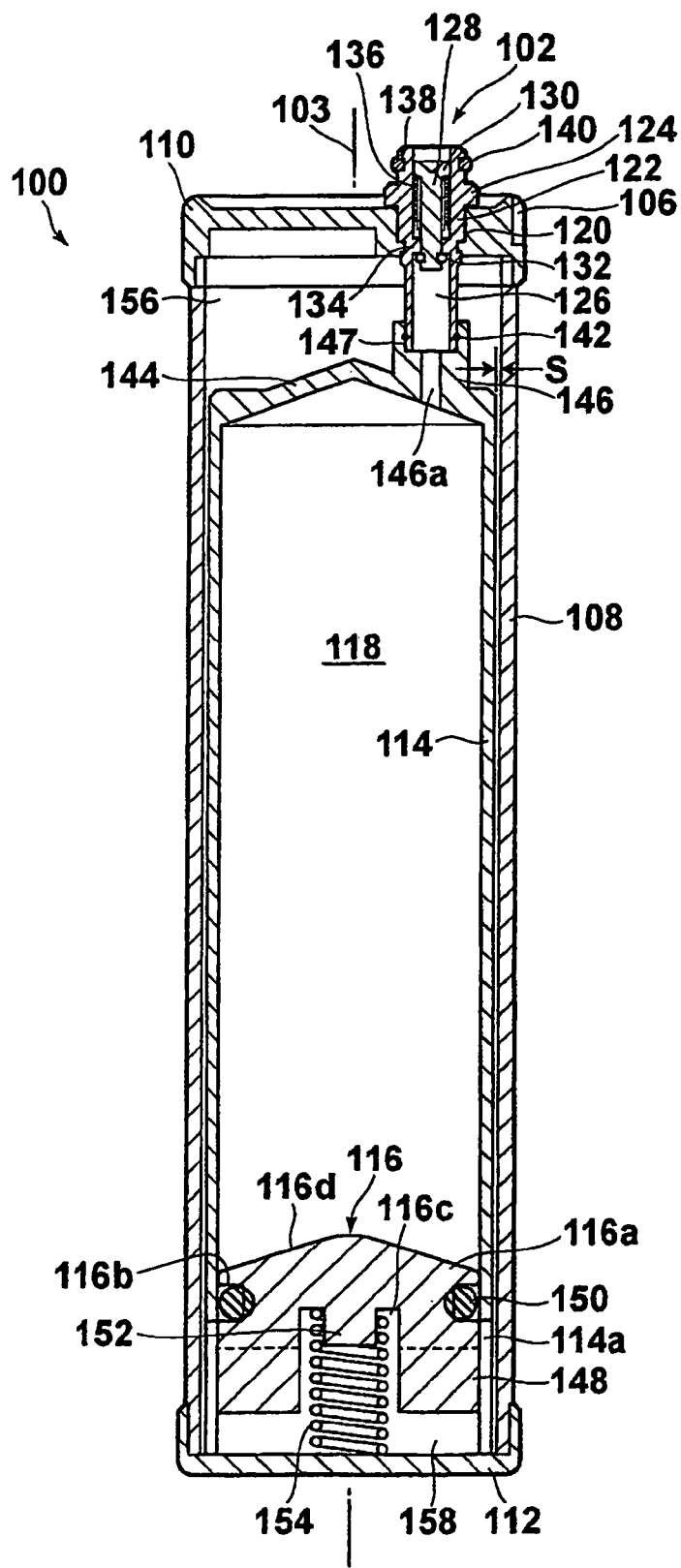
FIG. 4 is a cross section of the fuel cartridge.

Next, the cartridge 100 will be explained in detail in reference to FIG. 4. FIG. 4 is a longitudinal cross section passing through the plug (connecting section) 102. The whole cartridge 100 has a cylindrical shape. For example, the cartridge 100 has an outer cylinder (bomb) 108, and a top cap 110 and a bottom cap 112 for sealing the top and the bottom of the outer cylinder 108. The vertical direction herein is the vertical direction in FIG. 4. The outer cylinder 108 is made of polycarbonate and transparent. Inside the outer cylinder 108, an inner cylinder 114 is placed. The inner cylinder 114, for example is a cylindrical container made of a transparent polycarbonate. The inner cylinder 114 has a movable bottom 116 which can move along an inner surface of the inner cylinder 114 in the axial direction thereof. By use of the movable bottom 116 and the inner surface of the cylinder 114, a fuel storage chamber 118 for storing alcohol fuel such as methyl alcohol and ethyl alcohol is formed in the cylinder 114. As the fuel, dimethyl ether may be used in addition to alcohol fuel. The dimensions of the inner cylinder 114 and the outer cylinder 108 are determined so that a ring-shaped clearance S is formed between the outer peripheral surface of the inner cylinder 114 and the inner peripheral surface of the outer cylinder 108.

A material of the outer cylinder 108 is preferably a polycarbonate resin in terms of strength and transparency, but an AS resin and ABS resin may be used. A material of the inner cylinder 114 is preferably polypropylene resin in terms of methyl alcohol fuel resistance. Since the outer cylinder 108 and cylinder 114 are transparent, a position of the movable bottom 116 moving in the cylinder 114 in accordance with fuel consumption is visible, a remaining amount of the fuel in the fuel storage chamber 118 is visible. The top cover 110 and the bottom cover 112 of the outer cylinder 108 are made of, e.g., polycarbonate resin. The top cover 110 and the bottom cover 112 are fixed to the outer cylinder 108 by means of ultrasonic welding. Anyone of the top cover 110 and the bottom cover 112 may be formed integrally with the outer cylinder 108.

The plug 102 as a connecting section is provided at the top cover 110, and placed with eccentric arrangement with reference to the central axis 103. The whole plug has a cylindrical shape. The plug 102 has a male screw section 122 and a flange 124. The male screw section 122 is screwed into a screw hole 120 of the top cover 110, so that the plug 102 is joined with the top cover 110. The plug 102 has a through-hole 126 in the longitudinal direction thereof. A pintle 128 is slidably inserted in the through-hole 126. The top portion of the pintle 128 has an outer flange 130 for having a clearance fit inside the through-hole 126. An O ring 132A which serves as a valve body is fitted to a circumferential groove formed at the lower portion of the pintle 128. An inner flange 134 is formed at the middle portion of the through-hole 126. A compression coil spring 136 is installed between the outer flange 130 of the pintle 128 and the inner flange 134 of the through-hole 126. The compression coil spring 136 usually exerts upward pressure on the pintle 128. Accordingly, the O ring 132 is pressed against the inner flange 134, so that the throughhole 126 of plug 102 is closed with hermetic sealing. A circumferential groove 138 is formed on the outer surface of the upper potion of the plug 102. An O ring 140 is fitted in the circumferential groove 138. An O ring 142 is fitted a circumferential groove formed on the outer surface of the lower portion of the plug 102.

The movable bottom 116 is inserted in the inner cylinder 114 through an opening 158 of the one end of the inner cylinder 114. A cylindrical convex section (like a tube shape) 146 which serves as connector to the plug 102, is formed at a top wall 144 of the inner cylinder 114 with an eccentric arrangement with reference to the central axis 103. The cylindrical convex section has a through hole 146a formed in parallel with the central axis 103. The through hole 146a is in communication with the through hole 126 when the lower end of the plug 102 is inserted into the receiving portion 147 of the cylindrical convex section 146 via the O ring 142. The inner surface of the top wall 144 is substantially the same in shape as a top surface 116d of the movable bottom 116. This shape enables fuel to discharge efficiently.

The movable bottom 116 has a main body 116a with a disc shape or a cylindrical shape and with an outer diameter to be clearance-fitted in the cylinder 114, and ribs 148 formed at one end of the main body 116a integrally. The plural ribs 148 have radial arrangement. A circumferential groove 116b is formed on the outer periphery of the main body 116a of movable bottom. An O ring 150 is fitted into the circumferential groove 116b. The O ring 150 is in sliding contact with the inner surface of the cylinder 114, so that the inside of the fuel storage chamber 118 is maintained to be sealed. An annular groove 116c is formed at the center of the lower portion of the main body 116a of the movable bottom. A cylindrical projection 152 is formed inside the annular groove 116c. A compression coil spring 154 is interposed between the annular groove 116c and a bottom cover 112 of the outer cylinder 108. Notches 114a are formed to the lower portion of the inner cylinder 114 in the longitudinal direction of the cylinder 114. Each of the notches 114a has a length extending downward from just under the O ring 150 when the movable bottom 116 is positioned at the lower portion of the inner cylinder 114, as shown in FIG. 4.

A fuel of a mixture of methanol and pure water, or of ethanol and pure water, the mixture having a predetermined concentration, is stored in the fuel storage chamber 118 in each cartridge 100. A compressed gas G is encapsulated in a space 156 between the inner cylinder 114 and the outer cylinder 108. The compressed gas G enters into a lower space 158 of the inner cylinder 114 passing through the notches 114a, and then the pressure of the compressed gas G presses the movable bottom 116 upward from the lower space 158. Accordingly, the fuel in the fuel storage chamber 118 is always compressed, so that the fuel is discharged from the plug 102 outwardly immediately when the plug 102 is opened by the opening-movement of the valve 132. An inert gas is used as the compressed gas G. The plug 102, the pintle 128, the valve 132, and the spring 136 are constitute a fuel injection nozzle of the cartridge 100.

Figure 5A:
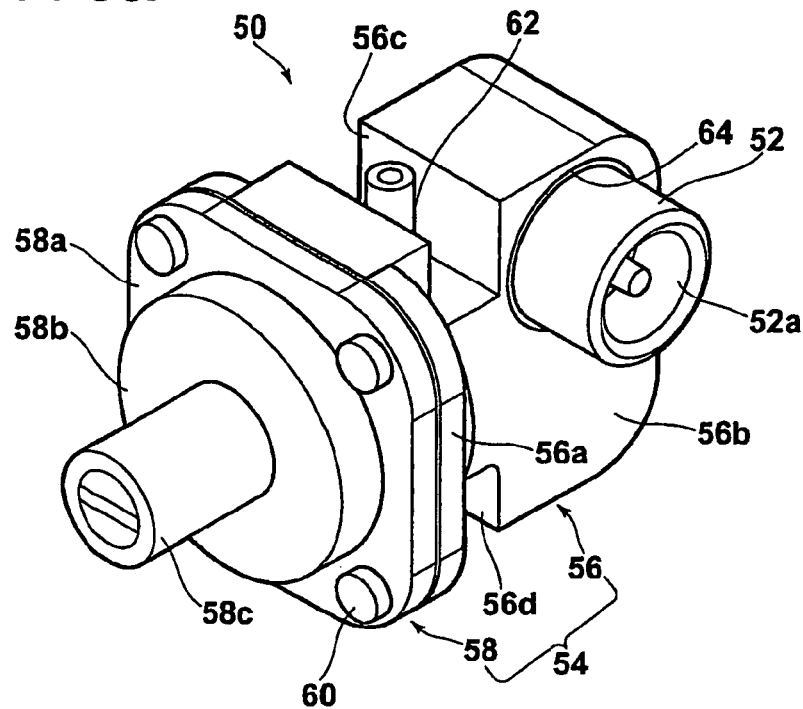
FIG. 5A is a perspective view seen from above showing the fuel supply system of the present invention.
Figure 5B:
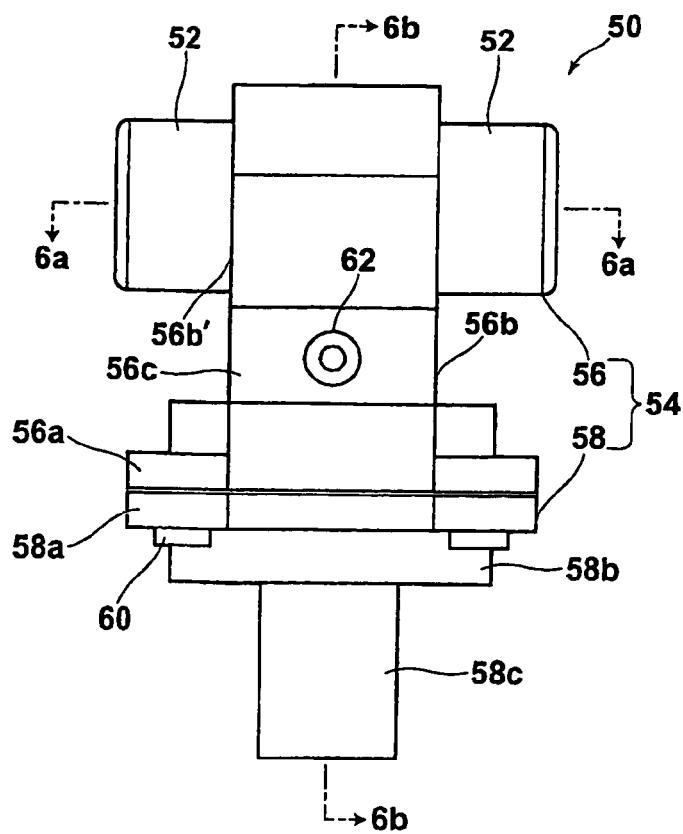
FIG. 5B is a plane view showing the fuel supply system of the present invention.

Next, the fuel pressure regulator 50 is schematically explained in reference to FIGS. 5A, 5B. FIGS. 5A, 5B show the pressure regulator 50, FIG. 5A is a perspective view seen from above, and FIG. 5B is a plain view. The pressure regulator 50 has a main body 54 including a casing section 56 and a cover section 58. The casing section 56 and the cover section 58 respectively have flanges 56a, 58a having the same substantially-rectangle shape. The flanges 56a, 58a face to each other and are joined to each other by use of a screw 60. A disk-convex section 58b projects on an outer surface of the cover section 58. A screw adjusting section 58c projects from the disk-convex section 58b.

The casing section 56 has two flat side-walls 56b, 56b' opposing each other and a pair of rectangle concave sections 56c, 56d formed in the vertical direction to be perpendicular to the side-walls 56b, 56b'. The vertical direction herein indicates the vertical direction in FIG. 5A, for convenience. Two (a pair of) cylindrical sockets 52 as fuel inlets are respectively formed at the side walls 56b and 56b' in the horizontal direction. The sockets 52 are arranged in mutually opposite direction.

These sockets 52 are arranged anti-symmetrically or substantially anti-symmetrically with reference to a center axis (which is shown by the numeral 51 of FIGS. 6A, 6B, and is also a center axis of a pressure-reducing valve including a diaphragm 82 and a movable member 84c with valve element 84c) of a screw adjusting section (apart of the after-mentioned pressure-reducing valve mechanism) of FIG. 5, at the casing section 56 (main body 56) of the pressure regulator in the vertical direction. The pair of the fuel inlets (sockets) 52 are arranged on the side-wall surfaces of the pressure regulator body, being opposed to each other. Thus, the two sockets (fuel inlets) 52 are opposed to each other at a different level in the vertical direction. Each socket 52 has a receiving section 52a into which the plug 102 of the cartridge 100 are inserted. A discharge nozzle 62 projects upwardly from the concave portion 56c on the upper side. The fuel regulated to a secondary pressure is discharged from the discharge nozzle 62.

Figure 6A:
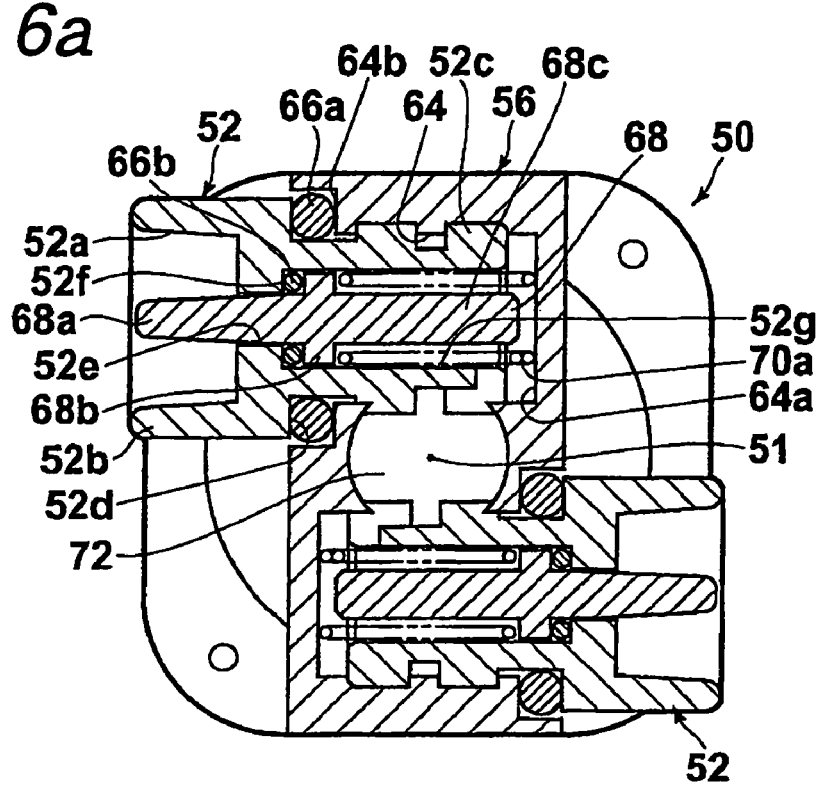
FIG. 6A is a cross section along a line 6a-6a of FIG. 5B.
Figure 6B:
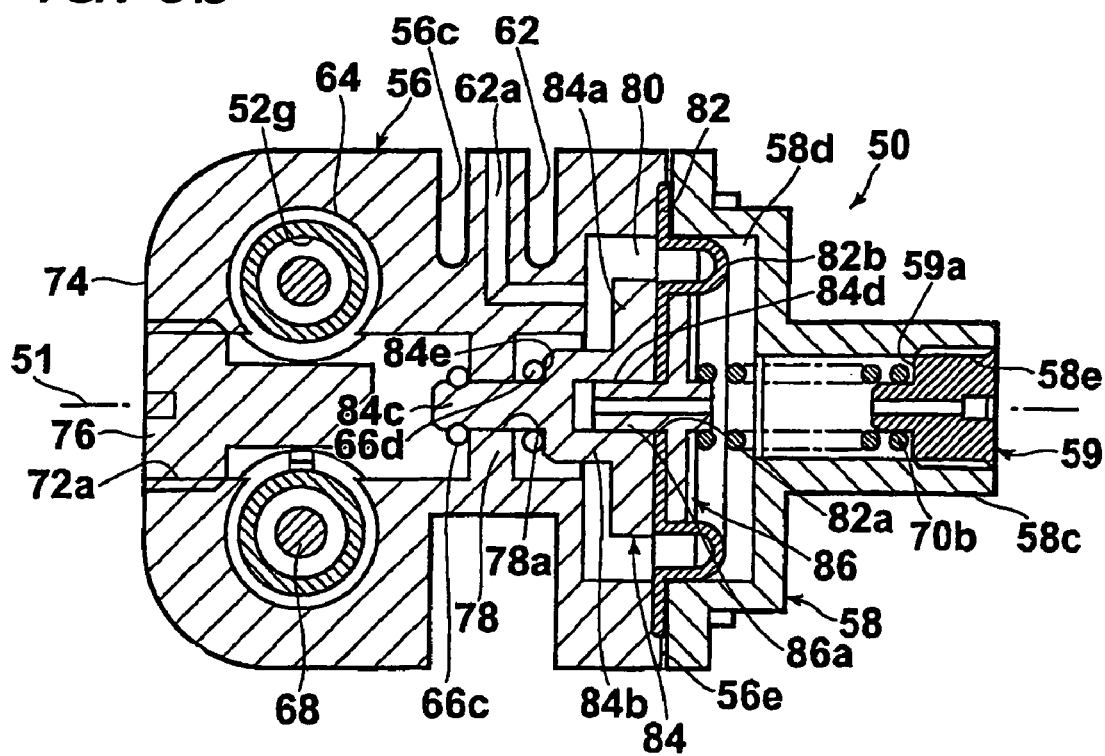
FIG. 6B is a cross section along a line 6b-6b of FIG. 5B.

Next, an inner structure of the pressure regulator 50 will be explained in detail in reference to FIG. 6. FIGS. 6A, 6B show a cross section of the pressure regulator 50. FIG. 6A is a cross section along the line 6a-6a of FIG. 5B. FIG. 6B is a cross section along the line 6b-6b of FIG. 5B. As shown in FIG. 6A, screw holes 64 receiving the above sockets (fuel inlets) 52 are respectively formed to the upper portion of the side wall 56b of the casing section 56 and the lower portion of the side wall 56b' of the casing section 56. As described above, the sockets 52 are arranged anti-symmetrically with respect to the central axis 51 passing through the center of the diaphragm 82 of the pressure regulator 50, and have the same shape as each other. Therefore, only one of the sockets 52 is explained, and the explanation of the other is omitted. The socket 52 has a cylindrical portion 52b inside which the plug-receiving portion 52a is formed, and a male screw portion 52c screwed into a screw hole 64 for a socket-insertion. The plug-receiving portion 52a is directed in parallel with a main surface of the diaphragm 82. The male screw portion 52c has a smaller diameter than the cylindrical portion 52b, and has a shoulder portion 52d on the behind of the cylindrical portion 52b, the annular shoulder portion 52d being directed backward. On the other hand, an annular concave portion 64b is formed around the opening of the socket insertion hole (screw hole) 64. When the socket 52 is screwed into the screw hole 64, an O ring 66a is compressed between the shoulder 52d and the annular concave portion 64b, so that a clearance between the socket 52 and the casing section 56 is sealed.

An orifice 52e is formed at the center of penetralia-wall of the plug-receiving portion (fuel inlet 52a) of the socket 52. The penetralia-wall of the plug-receiving portion 52a has an inner flange, and the center hole of the inner flange forms the orifice 52e. The orifice 52e communicates to a fuel-passage hole 52g in the socket 52. The fuel-passage hole 52g also serves as a valve member housing section which houses valve members such as O ring 66b to be used as a valve, a part 68c of a movable pintle 68 and a compression coil spring 70a. The diameter of the fuel-passage hole 52g is larger than that of the orifice 52e. A pintle 68 is placed over the plug-receiving portion 52a, the orifice 52e and the fuel passage hole 52g so as to be able to move in the axis direction. The pintle 68 includes a tapered portion 68a reaching into the plug receiving portion 52a from the orifice 52e, and a flange 68b and a main body 68c of the pintle 68 placed in the fuel-passage hole 52g. A diameter of the main body 68c in the pintle 68 is almost the same as that of the tapered portion 68a. The compression coil spring 70a is placed between a penetralia wall 64a of the screw hole 64 and the flange 68b in a compressed manner. An O ring 66b to be used as the valve is placed between the outer flange 68b of the pintle 68 and the back side 52f of the inner flange of the socket 52. Accordingly, the flange 68b presses O ring 66b to the back 52f of the inner flange by use of resilient force of the compression coil spring 70a, the hole 52g and the inlet 52a being closed to each other.

Next, the pressure regulator 50 will be further explained in detail in reference to FIG. 6B. The two screw holes 64 for socket insertion are in communications with a halfway chamber 72 in an intermediate position between the two screw holes 64. In other words, the two sockets 52 with valve-housing sections for fuel inlets are arranged in parallel to each other or in substantially parallel to each other, and the common fuel-receiving chamber (halfway chamber) 72 is interposed between the sockets 52 (valve-housing sections 52g). The halfway chamber 72 serves as a common fuel-receiving chamber for enabling to receive fuel took in from any of sockets 52 as the fuel inlets 52. The halfway chamber 72 (common fuel-receiving chamber) and each of the screw holes 64 (in other words sockets 52 with the valve-housing sections 52g are arranged with grade separated crossing. The halfway chamber is arranged on the center axis line 51 of the pressure regulator 50. The halfway chamber 72 is formed inwardly from the end wall 74 of the casing section 56. The opening 72a, which is provided at the end wall 74 for making the half-way chamber 72, is screwed by use of a plug 76, and sealed. The half-way chamber 72 also is in communication with a pressure regulating chamber 80 through an orifice 78a provided at a partition wall 78. The pressure regulating chamber 80 is formed adjacent to the halfway chamber 72. A valve movable member 84, a diaphragm 82, and the like forming the pressure-reducing valve mechanism are mounted in the pressure regulating chamber 80. The halfway chamber 72 is formed on an axis of the pressure-reducing valve mechanism (the diaphragm 82 and valve member 84) and immediately upstream the pressure-reducing valve mechanism. When each fuel supply cartridge is connected to socket (the fuel inlet) 52, the valve (pintle) 68 is opened and the fuel inlet 52 is opened. The above mentioned structure achieves a compact shape of the pressure regulator.

The cover section 58 is attached on the front surface 56e of the casing section 56. A diaphragm 82 having a substantially-disc shape is provided between the casing section 56 and the cover section 58. One side of the diaphragm 82 receives the fuel pressure of the pressure regulating chamber, and another side of the diaphragm 82 receives the atmospheric pressure. The valve movable member 84 is hermetically attached to the center hole 82a of the diaphragm 82, and an annular protrusion 82b concentric with the center hole 82a is formed on the diaphragm 82. The valve movable member 84 attached on one side of the diaphragm 82 is located at the pressure regulating chamber 80, and a supporter 86 is attached on another side of the diaphragm 82, the side being opposite to the pressure regulating chamber 80.

The valve movable member 84 has a flange portion 84a, a boss portion 84b, and a valve shaft 84c, which are a concentric structure. The flange portion 84a serves as an attaching face to the diaphragm 82, the boss portion 84b projects from the flange portion 84a, and the valve shaft 84c is inserted to the orifice 78a from the boss portion 84b. In the valve movable member 84, a screw hole 84d for joining the supporter 86 is provided at the center position, and it is aligned with the center hole 82a of the diaphragm 82. An O ring 66c to be used as a pressure-regulating (reducing) valve is fixed on the outer surface of the valve shaft 84c and near the tip of the shaft 84c. An O ring 66d is fixed near a shoulder 84e of the boss portion 84b on the outer surface of the valve shaft. These O rings 66c and 66d are placed in the circumferential groove formed on the valve shaft 84c so that the O rings 66c and 66d are mutually positioned on opposite sides of the partition wall 78. The valve shaft 84c and O ring 66c configure a regulating valve for reducing the fuel to be supplied to the fuel cell from primary pressure to secondary pressure.

The above-described supporter 86 is a substantially disc-shaped member. The supporter 86A has a males crew portion 86a which are screwed into the screw hole 84d of the valve movable member 84. The male screw portion 86a is positioned at the center of supporter 86A. In this structure, the diaphragm 82 is sandwiched between the valve movable member 84 and the supporter 86. Namely, the valve movable member 84 is engaged with the supporter 86 across the diaphragm 82, so that the valve movable member 84 is mounted to the diaphragm 82.

The cover section 58 has an atmospheric chamber 58d which includes the diaphragm 82 and supporter 86. The atmospheric chamber 58d is in communication with a hole 58e of a screw adjusting portion 58c. A female screw is formed to the hole 58e. A pressure regulating screw 59 is screwed into the hole 58e, and fixed. A compression coil spring 70b is installed between an inward directed shoulder 59a of the pressure regulating screw 59 and the supporter 86, to exert an appropriate pressure to the diaphragm 82. This pressure is regulated by the pressure regulating screw 59. Namely, a difference between the secondary pressure in the pressure regulating chamber 80 and the atmospheric pressure is substantially constant. The pressure regulating chamber 80 has an inner surface substantially similar to a shape of an outside diameter of the valve movable member 84. A fuel outlet 62a in communication with the pressure regulating chamber 80 is formed so as to serve as the discharging nozzle 62, and it is provided at the above-described concave portion 56c.

Figure 7:
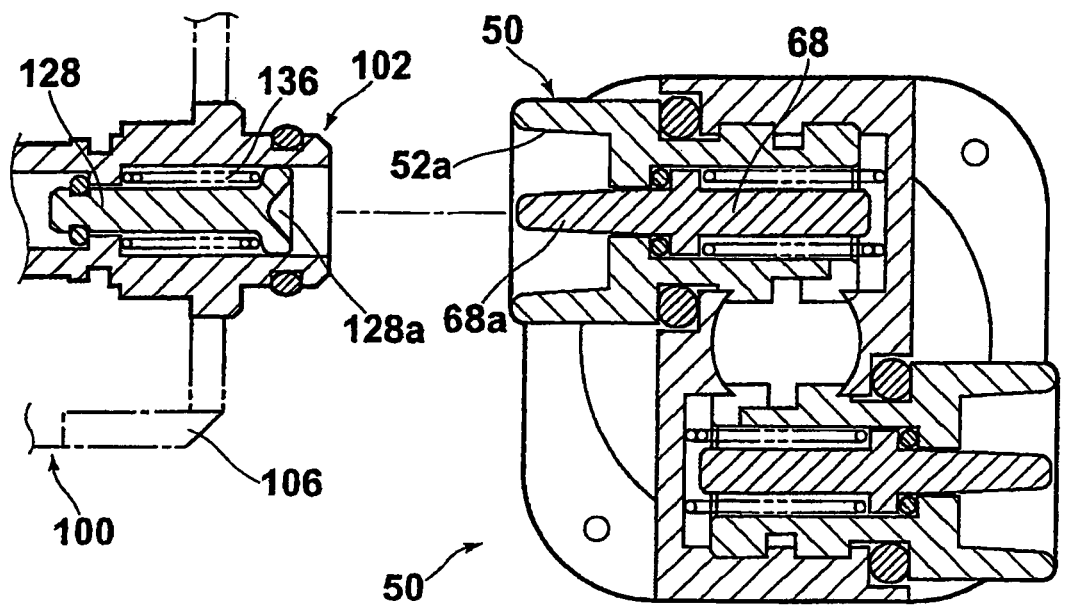
FIG. 7 is a cross section showing the state before the fuel cartridges are mounted to the fuel supply system, together with a connecting plug of the fuel cartridge.
Figure 8:
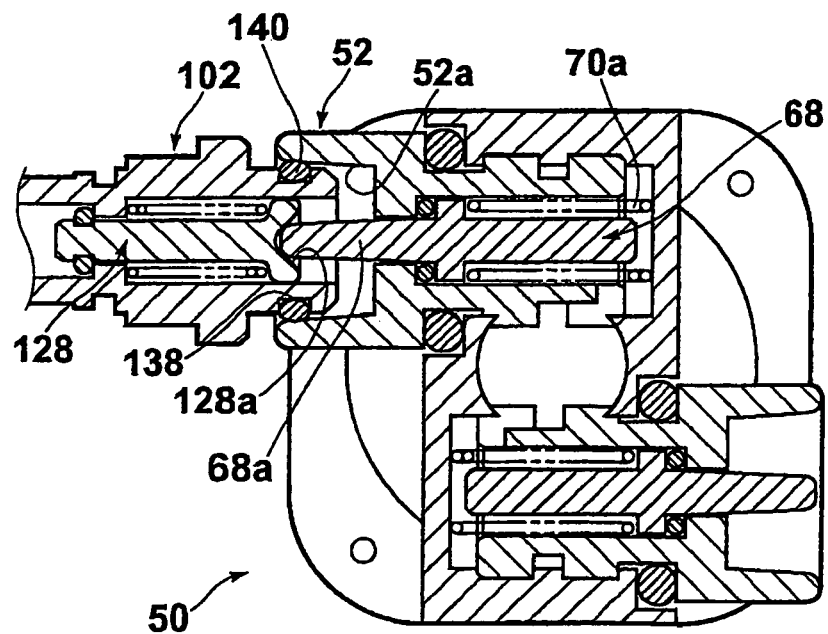
FIG. 8 is a cross section showing the fuel supply system in the initial step where the fuel cartridge begins connecting to a pressure regulator, together with the connecting plug of the fuel cartridge.
Figure 9:
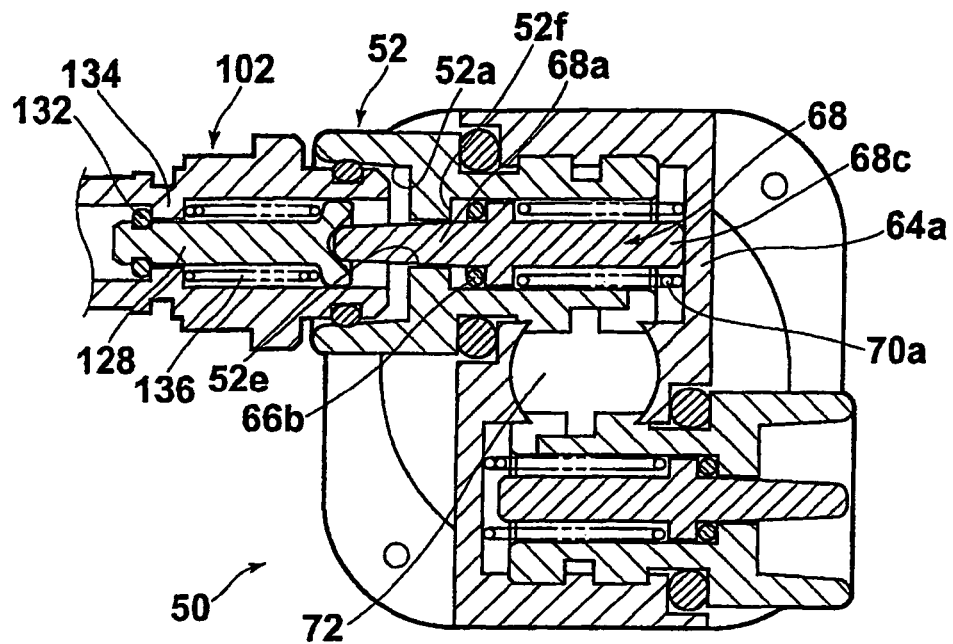
FIG. 9 is a cross section showing the fuel supply system just before the connection is complete, together with the connecting portion of the fuel cartridge.
Figure 10:
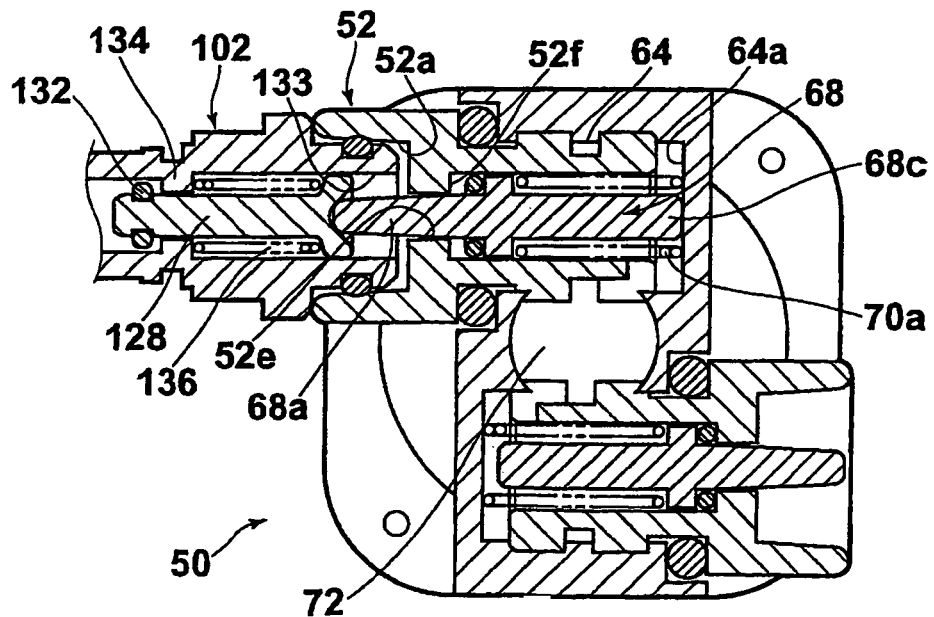
FIG. 10 is a cross section showing the fuel supply system when the connection is complete, together with the connecting portion of the fuel cartridge.

Next, the case where the cartridge 100 is connected to the pressure regulator 50 will be explained in reference to FIGS. 7 to 10. The cartridge 100 is partially shown in FIG. 7, and omitted in FIGS. 8 to 10. FIG. 7 is a cross section showing the state before the cartridge 100 is connected to the pressure regulator 50. FIG. 8 is a cross section showing the initial step where the cartridge 100 begins connecting to the pressure regulator 50. FIG. 9 is across section showing the state just before the connection. FIG. 10 is a cross section showing the state where the connection is completed. These Figures also show the connecting portion 102 of the cartridge 100.

As shown in FIG. 7, the plug 102 as the connecting portion 102 of the cartridge 100 approaches the fuel inlet (plug-receiving portion) 52a in the state that the axis of the plug 102 and the axis of the fuel inlet 52a of the socket 52 are substantially matched with each other, through the keying means including the key groove 106. In this case, the inside of the plug 102 is filled with fuel pressured with primary pressure. Next, as shown in FIG. 8, when the plug 102 is began to insert into the fuel inlet 52a, the tip portion 68a of the pintle 68 on the side of the pressure regulator 50 comes in contact with a concave 128a on the tip of the pintle 128 on the side of the cartridge 100. In this state, the pintles 68, 128 do not move yet. Accordingly, the cartridge 100 is maintained to be sealed. The pressure regulator 50 is maintained to be sealed. In this case, the O ring 140 of the plug 102 is pressed against the inner surface of the inlet 52a, so that the inlet 52a is sealed.

When further thrusting the cartridge 100, the plug 102 further comes into the inlet 52a, as shown in FIG. 9. In this case, since an elasticity of the compression coil spring 70a of the pintle 68 is set weaker than that of the compressed coil spring 136 on the side of the cartridge 100, the pintle 68 is pressed into the screw hole 64 by means of the pintle 128. This movement continues until the main body 68c of the pintle 68 comes in contact with the penetralia wall 64a of the screw hole 64. As a result, the O ring (valve element) 66b in the screw hole 64 is separated from the back side 52f of the inner flange of the socket 52, so that the sealing of the inlet orifice 52e is released. On the other hand, since the O ring 132 of plug 102 is still in contact with the inner flange 134 in the plug 102 of the cartridge 100, the fuel having the primary pressure is not injected into the inlet 52a.

Next, as shown in FIG. 10, when further thrusting the cartridge 100, and the plug is completely inserted, the pintle 68 comes in contact with the penetralia wall 64a of the screw hole 64, and the pintle 68 is prevent from further moving. Thereby, after that, the pintle 128 on the side of the cartridge 100 is pressed into the cartridge 100. Accordingly, the O ring 132 is separated from the inner flange 134. The fuel having the primary pressure flows into the halfway chamber 72 through a center orifice of the inner flange 134, the outer flange 130, the orifice 52e, and the screw hole 64.

A further flow path of the fuel will be explained in reference to FIG. 6B. The pressure regulating chamber 80 is previously set to maintain the balance of the diaphragm 82 by use of a desired secondary pressure against the atmospheric pressure. When fuel is discharged from the outlet (the discharging nozzle 62) and thereby pressure in the pressure regulating chamber 80 decrease to pressure lower than a predetermined secondary pressure, the atmospheric pressure exceeds the secondary pressure, and the diaphragm 82 is pressed out toward the pressure regulating chamber 80 by means of the spring 70b. As a result, the O ring 66c is separated from the partition wall 78. Fuel with primary pressure in the halfway chamber 72, the fuel having a pressure higher than the set secondary pressure, flows into the pressure regulating chamber 80. Thereby, the pressure of the pressure regulating chamber 80 increases to the desired secondary pressure. In this state, the diaphragm 82 returns into its original place (here, in the right direction), and the O ring 66c is pressed against the partition wall 78 again. Therefore, the halfway chamber 72 and the pressure regulating chamber 80 are closed to each other. In supplying a fuel, this movement is repeated in accordance with fuel consumption.

As the fuel is consumed over time, a compressed gas G presses the movable bottom 116 into the cylinder 114 gradually. Until the movable bottom 116 comes close to the top wall 144, the fuel can be discharged from the plug 102.

This embodiment is explained based on the case where single or two fuel cartridges 100 are used. The number of the fuel cartridges is not limited to two. Two or more fuel cartridges can be connected by use of a branch pipe (not shown) between the fuel cartridge 100 and pressure regulator 50. For example, four fuel cartridges are connected so that a fuel capacity for one cartridge becomes small. Accordingly, the fuel cartridge can be further compact. As described above, a plurality of compact fuel cartridges can be connected to supply a large capacity of fuel. In this embodiment, the case where one outlet 62a of the pressure regulator 50 is used is explained. The number of the outlets is not limited to one. Two or more outlets may be used. The number of the connecting openings of the fuel cell 26 to which the outlet 62a of the pressure regulator 50 is connected is not limited to one. Two or more connecting openings may be used. The number of the outlets 62a of the pressure regulator 50 does not always need to be the same as the number of the connecting openings of the fuel cell 26. It is preferable that the number of the connecting openings of the fuel cell 26 is two or more to supply a fuel to a plurality of unit cells (not shown) equally. When the fuel cell 26 includes a plurality of units each having a plurality of the above unit cells connected in series, the unit being one power unit (not shown), a pressure of each power unit can be preferably regulated to supply a fuel to each power unit equally. A second pressure regulator (not shown) is placed between the pressure regulator 50 and fuel cartridge, so that a fuel can be supplied to the above power units equally.

Figure 11A:
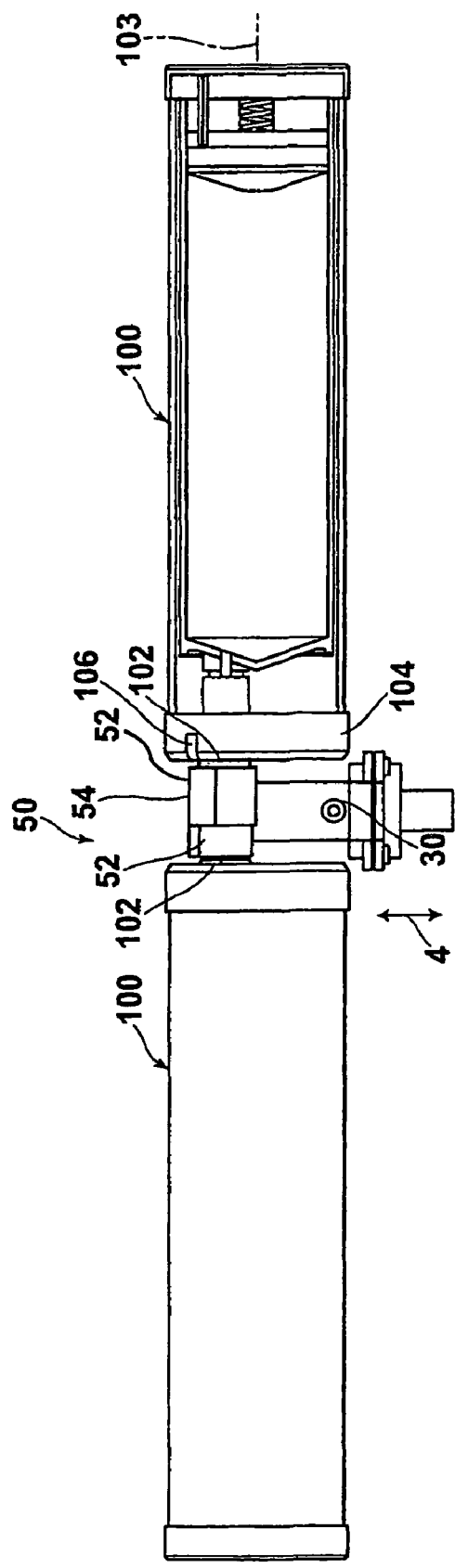
FIG. 11A is a plane view showing a positional relationship between the fuel supply system and fuel cartridges when the fuel cartridges are attached to the fuel supply system.
Figure 11B:
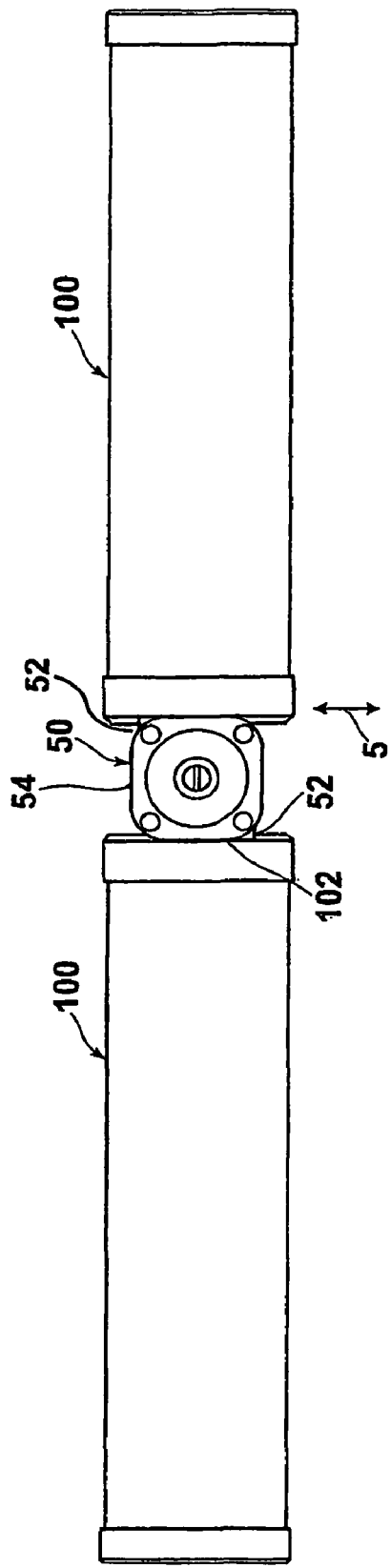
FIG. 11B is a front view showing a positional relationship between the fuel supply system and fuel cartridges when the fuel cartridges are attached to the fuel supply system.

FIGS. 11A, 11B show the positional relationship between the fuel supply system for a fuel cell and fuel cartridges 100 when the cartridges 100 are mounted to the fuel supply system for fuel cells. FIG. 11A is the plane view. FIG. 11 is the front view. In order to shorten a total length of the fuel cartridges 100 in the axial direction when the fuel cartridge 100 is mounted to the fuel supply system, a surface of the flat side wall 56b of the casing section 56 of the pressure regulator is flush with a surface of the inlet 52a connected to the other fuel cartridge. The flanges 56a, 58a are placed outside the diameter of the fuel cartridge 100 not to be in contact with the top cover 110 sealing the outer cylinder 108 of the fuel cartridge 100. Accordingly, a length of the pressure regulator 50 in the axial direction of the fuel cartridge 100 is a length of the casing section 56 and a socket 52 of the pressure regulator 50 required for supplying a fuel from one fuel cartridge 100. Two fuel cartridges can be connected to the pressure regulator 50. As a result, the fuel supply portion can be more compact.

The present invention contributes to the popularization of electronic equipment using fuel cells.

The effects of the above embodiments are organized as follows.

(1) At least two fuel cartridges can be mounted to a single pressure regulator.

(2) When the outlet of the pressure regulator is directed perpendicular to an axis of the pressure regulator which is along the outer edge of the electronic equipment, the outlet (discharging nozzle) does not interfere with the fuel cartridges while two fuel cartridges are placed.

(3) When the fuel inlets of the pressure regulator are placed anti-symmetrically with reference to the axis, a set space between two fuel cartridges can be small, and thereby the fuel cartridges can be installed in a small space.

(4) Especially when a pair of the fuel inlets are placed anti-symmetrically or substantially anti-symmetrically with reference to a central axis of the diaphragm (pressure-reducing valve mechanism), a compactness can be achieved by decreasing a scale of the fuel cartridges in the straight arranging direction. Additionally, the fuel cartridges to be mounted can be placed in a small space collinearly. Further, a scale of the fuel cartridge is expanded by a compressed size of the pressure regulator, thereby increasing a capacity of a fuel in a predetermined space of the fuel cartridge.

(5) According to the fuel supply system for a fuel cell or electronic equipment of the present invention, two fuel cartridges are placed to both sides of the pressure regulator. Accordingly, the fuel cartridges can be compact, and thus is convenient to carry. Additionally, the electronic equipment can be used for long time.

Especially, a scale of the fuel cartridge can be increased by a compressed size of the pressure regulator, it makes possible to increase a fuel capacity of the fuel cartridge.

(6) When the electronic equipment is a notebook personal computer, and the fuel supply system is placed near a hinge portion of a cover member connected to the body of the notebook personal computer along the hinge portion, the heavy weight apparatus and fuel cartridges are placed to the body. Accordingly, the stability of the notebook PC is maintained when set up.

What is claimed is:

1. A fuel supply system for supplying fuel into a fuel cell of notebook type electronic equipment, said system comprising:
a pressure regulator having a pair of inlets being arranged in mutually opposite directions, a mechanism for converting primary-pressure of said fuel taken in via said inlets into secondary-pressure, and an outlet for sending out secondary-pressure fuel to said fuel cell; and
a pair of cylindrical fuel cartridges which are respectively connected with said inlets of said pressure regulator to supply primary-pressure fuel,
wherein said fuel cartridges are placed across said pressure regulator from each other with longitudinal axes of the cylindrical fuel cartridges coaxial and parallel to a substantially-straight outer edge of said electronic equipment.

2. The fuel supply system according to claim 1, wherein said outlet of said fuel regulator comprises a discharge nozzle for discharging said secondary-pressure fuel regulated by said pressure regulator; said discharge nozzle is arranged in a direction perpendicular to said substantially-straight outer edge to supply said fuel cell in said electronic equipment.

3. The fuel supply system according to claim 1, wherein said fuel cartridges have nozzles connectable to said inlets of said pressure regulator, each of said nozzles is provided at an eccentric arrangement relative to a central axis of a cylinder of each fuel cartridge, and said inlets of said pressure regulator are arranged in mutually opposite directions with correspondence to the nozzle arrangement of said fuel cartridge.

4. The fuel supply system according to claim 1, wherein said electronic equipment is a notebook personal computer, and has a cover member being joined to a main unit of said personal computer via a hinge;
components of said fuel supply system are installed to the main unit of said personal computer along said hinge.

5. The fuel supply system according to claim 1, wherein said mechanism for converting primary-pressure of said fuel taken in via said inlets into secondary-pressure comprises a regulating valve for reducing fuel pressure from primary pressure to secondary pressure and said pressure regulator further comprises:
a pressure regulating chamber into which said fuel passing through said regulating valve flows;
a diaphragm arranged between said pressure regulating chamber and an atmospheric chamber so as to undergo displacement in response to said secondary pressure in said pressure regulating chamber; and
a linkage for linking said regulating valve to said diaphragm.

6. The fuel supply system according to claim 5, wherein said outlet is arranged along an outer edge of said electronic equipment and directed perpendicularly to an axis passing through said pressure regulator.

7. The fuel supply system according to claim 6, wherein said inlets are arranged anti-symmetrically or substantially anti-symmetrically with reference to said axis.

8. The fuel supply system according to claim 5, wherein said inlets are arranged anti-symmetrically or substantially anti-symmetrically with reference to a central axis of said diaphragm.

9. The fuel supply system according to claim 1, wherein said fuel cartridges can be connected individually to each of said pair of inlets of said pressure regulator so that a user is allowed to use said fuel cartridges in either case of a single and a pair;
wherein said mechanism for converting primary-pressure of said fuel taken in via said inlets into secondary-pressure is a pressure-reducing valve mechanism for reducing pressure of fuel injected by either or both of said cartridges from primary pressure to secondary pressure; and
wherein said pair of fuel inlets are arranged anti-symmetrically or substantially anti-symmetrically with reference to an axis of said pressure-reducing valve mechanism.

10. The fuel supply system according to claim 9, wherein a common liquid-receiving chamber for receiving fuel taken in from any of said inlets is provided on an axis of said pressure-reducing valve mechanism and immediately upstream said pressure-reducing valve mechanism.

11. The fuel supply system according to claim 9, said pressure regulator further comprises an atmospheric inlet used for said pressure-reducing valve mechanism, wherein said atmospheric inlet, said fuel inlets, and said outlet are arranged on a body of said regulator in three directions which are at an angle of 90 degrees or substantially 90 degrees relative to each other.

12. The fuel supply system according to claim 9, wherein said pair of fuel inlets are respectively provided with valves which open respective fuel inlets when fuel supply cartridges are connected to said fuel inlets, their valve-housing sections are arranged in parallel to each other or in substantially parallel to each other, and said common fuel-receiving chamber is interposed between said valve-housing sections.

13. Electronic equipment comprising:
a fuel cell as a power supply;
a cartridge-loading section for loading fuel supply cartridges for use in said fuel cell;

a fuel pressure regulator for regulating pressure of fuel supplied to said fuel cell, wherein said cartridge loading section is configured so that at least a pair of said cartridges can be loaded interposing said regulator between them along an outer edge of said electronic equipment; said regulator has at least one pair of fuel inlets directed opposite each other, and said fuel inlets are allowed to connect to said cartridges with removability.

14. The electronic equipment according to claim 13, wherein said pressure regulator includes at least a pair of fuel inlets with which fuel supply cartridges can be connected individually so that user is allowed to use said cartridges in either case of a single and a pair;

a pressure-reducing valve mechanism for reducing pressure of fuel injected by either or both of said cartridges from primary pressure to secondary pressure; and an outlet for sending out the secondary-pressure fuel to said fuel cell, wherein said pair of fuel inlets are arranged anti-symmetrically or substantially anti-symmetrically with reference to an axis of said pressure-reducing valve mechanism.

15. The electronic equipment according to claim 13, wherein said cartridge loading section is provided at an outer edge of one side of said electronic equipment, said pressure regulator is provided at a longitudinal center of said cartridge loading section, and insertion port for loading and unloading said fuel cartridges into said loading section are provided at both ends sides of said cartridge loading section.

16. A fuel supply system for supplying fuel into a fuel cell of a notebook type electronic equipment including a main unit and a hinged cover member having a display and being joined with said main unit with a hinge portion at a rear end of said main unit to open and close said display, said system comprising:

a pressure regulator having a pair of inlets being arranged in mutually opposite directions, a mechanism for converting primary-pressure of said fuel taken in via said inlets into secondary-pressure, and an outlet for sending out secondary-pressure fuel to said fuel cell;

a pair of cylindrical fuel cartridges which are respectively connected with said inlets of said pressure regulator to supply primary-pressure fuel, and a pair of cylindrical loading cavities for said fuel cartridges;

wherein said cylindrical loading cavities and said pressure regulator are provided at said rear end of said main unit in parallel with an axis of said hinge portion so that said pressure regulator is interposed between said cylindrical loading cavities, and respective openings for inserting said fuel cartridges into said cylindrical loading cavities are provided both sides of said rear end to place said fuel cartridges across said pressure regulator in a straight line.

17. The fuel supply system according to claim 16, wherein said outlet of said fuel regulator comprises a discharge nozzle for discharging said secondary-pressure fuel regulated by said pressure regulator; said discharge nozzle is arranged in a direction perpendicular to said straight line of said fuel cartridges to supply said fuel cell in said electronic equipment.

18. The fuel supply system according to claim 1, wherein said fuel cartridges have nozzles connectable to said inlets of said pressure regulator, each of said nozzles is provided at an eccentric arrangement relative to a central axis of a cylinder of each fuel cartridge, and said inlets of said pressure regulator are arranged in mutually opposite directions with correspondence to the nozzle arrangement of said fuel cartridge.

* * * * *